(No Model.)
G. B. SLOAT.
SEAT FOR BATH TUBS.
No. 390,407. Patented Oct. 2, 1888.
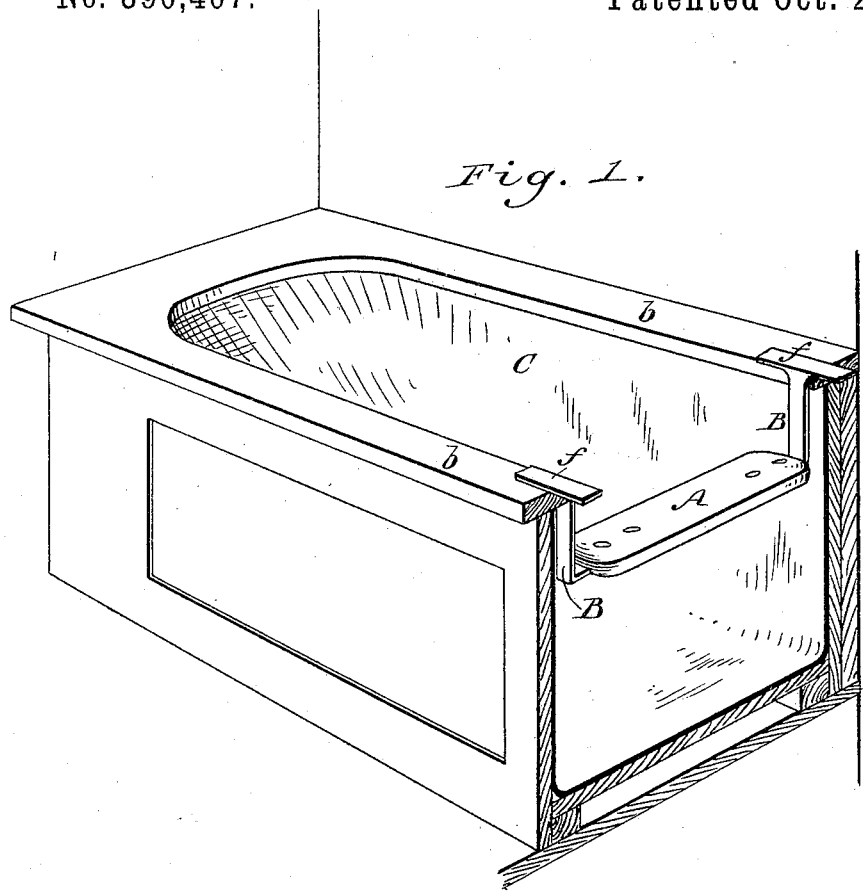
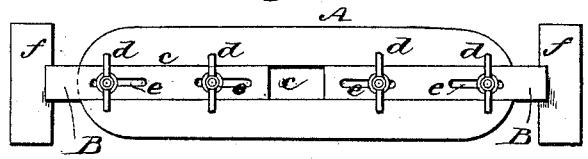
WITNESSES:
John M. Deemer
C. Sedgwick
INVENTOR:
G. B. Sloat
BY Munn &Co.
ATTORNEYS.

UNITED STATES PATENT OFFICE.

GEORGE B. SLOAT, OF PHILADELPHIA, PENNSYLVANIA.

SEAT FOR BATH-TUBS.

SPECIFICATION forming part of Letters Patent No. 390,407, dated October 2, 1888.

Application filed January 26, 1888. Serial No. 261,975. (No model.)

*To all whom it may concern:*

Be it known that I, GEORGE B. SLOAT, of the city and county of Philadelphia, and State of Pennsylvania, have invented a new and useful Improvement in Seats for Bath-Tubs, of which the following is a full, clear, and exact description.

This invention consists in an adjustable and sliding seat for bath-tubs, substantially as hereinafter described, and pointed out in the claims.

Reference is to be had to the accompanying drawings, forming a part of this specification, in which similar letters of reference indicate corresponding parts in both the figures.

Figure 1 represents a view in perspective of a bath-tub in part with my improved seat applied, and Fig. 2 is an inverted plan of the seat detached from the tub.

A is the body of the seat or seat proper, which may be made of hard wood, and which is somewhat shorter than the width of the ordinary bath-tub. Said seat is provided at its opposite ends with bent-metal arms B B, constructed to form hangers, whereby the seat A may be supported or rest indirectly upon the upper side marginal portions, $b\ b$, of the bath-tub C, or, where the bath-tub is flush with the wall of the bath-room, upon a strip or strips of wood secured by screws and corresponding to the upper side marginal portion or portions, $b$, of the bath-tub.

The arms or hangers B are formed of bent metal bars shaped below to fit and slide within or along a longitudinal groove, $c$, in the under side of the seat A, where they are secured by thumb-screw fastenings $d$ passing through slots $e$ in the bars. These bars are bent upward at either end of the seat A and terminate above in slides or lips $f$, which bear and rest upon the upper marginal portions, $b$, of the bath-tub, thus carrying the seat A.

The adjustment of the hangers B B in or out relatively to the ends of the seat proper, A, which the construction, as described, provides for, adapts the seat to different widths of bath-tub, and the crooked construction of the hangers B B prevents the seat from slipping out of or off the tub, and causes them also to act as guides to keep the seat in proper transverse relation with the tub, the lips $f$ constituting the sliding supports. The whole contrivance virtually forms a crank-shaped or pendent armed seat adjustable on and along the bath-tub, and which may be readily pushed backward out of the way when not required to be used and still be connected with the bath-tub for use when needed.

Among some of the purposes or uses to which such a seat may be applied may be mentioned the following: first, to sit upon when washing the feet only; second, to carry a wash-basin or other bath-room article; third, to place a child upon while being washed; fourth, to hang bath-cloths or towels upon to dry.

Having thus described my invention, what I claim as new, and desire to secure by Letters Patent, is—

1. In a seat for bath-tubs, the combination, with the seat proper, A, of the attached upturned arms or hangers B B, adjustable in and out relatively to the length of the seat, and provided with upper sliding supports or projections, $f\ f$, essentially as shown and described.

2. As an improved article of manufacture, a bath-tube seat consisting in the seat proper, A, having longitudinal grooves in its under side, the oppositely-arranged ⌐-shaped hangers B, the lower horizontal members of which are longitudinally slotted and enter the grooves from opposite ends of the seat, and the set-screws extending through said slots for holding the hangers in any desired position, substantially as set forth.

GEORGE B. SLOAT.

Witnesses:
JOSEPH FRANKISH, Jr.,
ALEX. C. ADAMS.